March 2, 1943.  F. HURUM  2,313,017
INTERNAL COMBUSTION ENGINE
Filed May 9, 1941  2 Sheets-Sheet 2
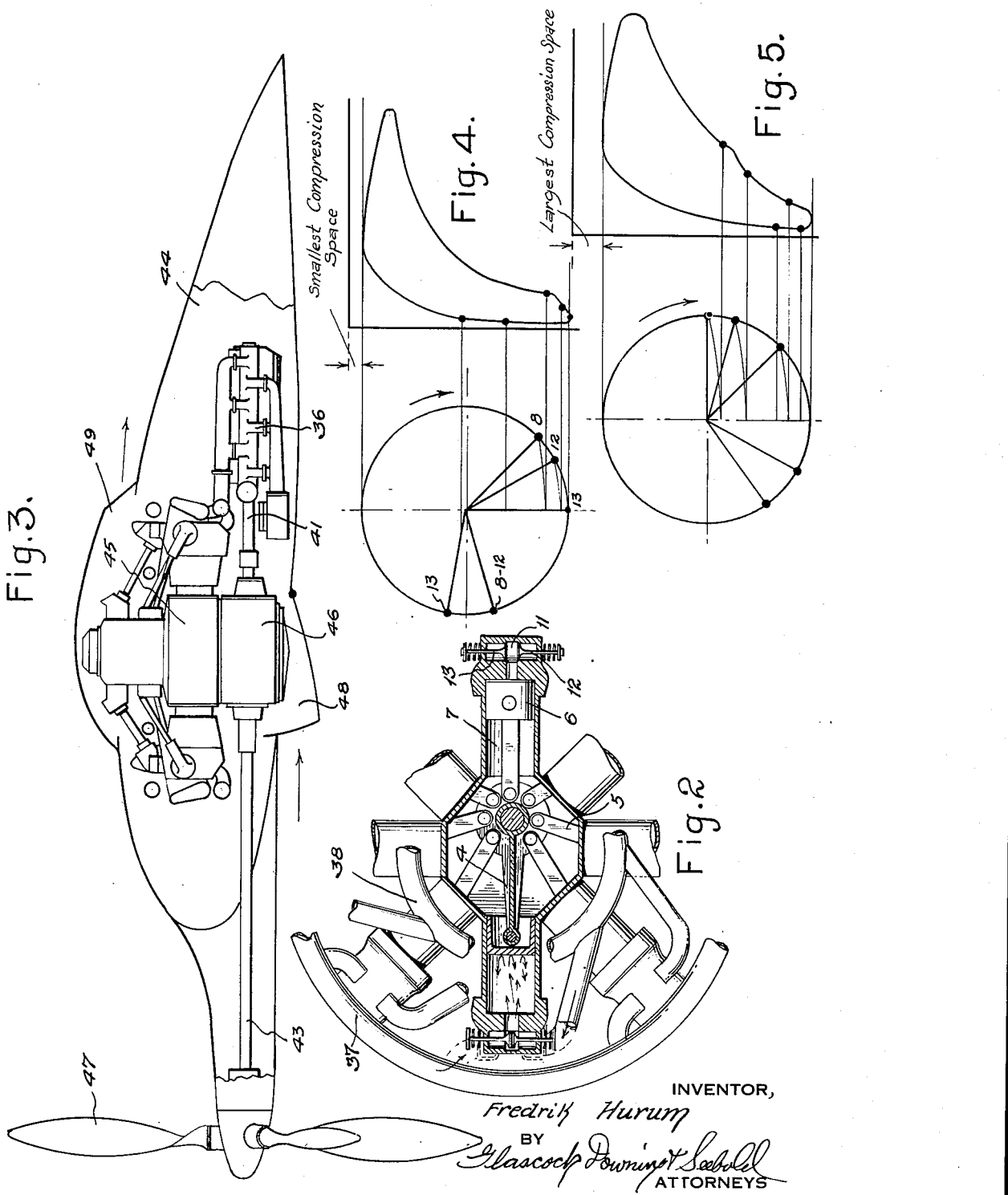
INVENTOR,
Fredrik Hurum
BY
Glascock Downing & Seebold
ATTORNEYS Patented Mar. 2, 1943

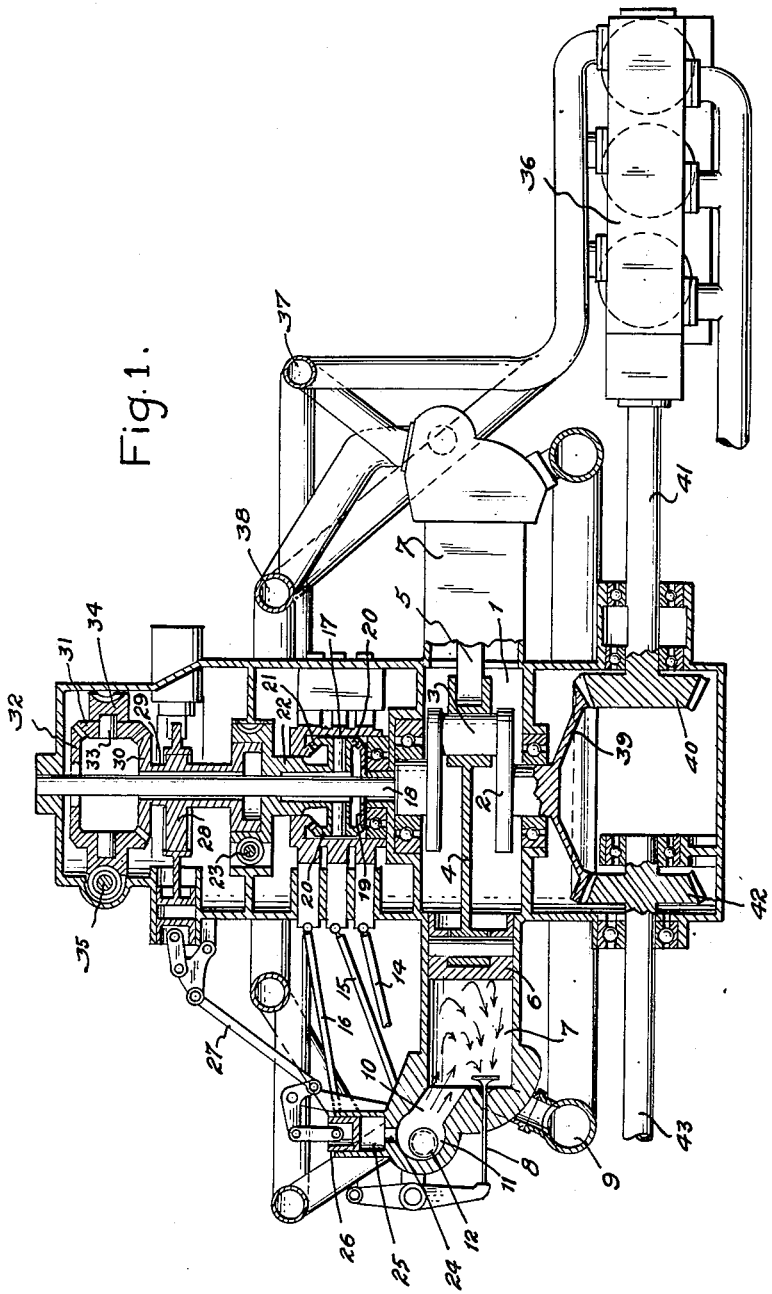

2,313,017

UNITED STATES PATENT OFFICE 2,313,017

INTERNAL COMBUSTION ENGINE

Fredrik Hurum, Trondheim, Norway; vested in the Alien Property Custodian

Application May 9, 1941, Serial No. 392,754

4 Claims. (Cl. 123—65)

The present invention relates to internal combustion engines and has for its object to provide an internal combustion engine which will afford great economy and large boosting power. More specifically the invention has for its object to provide means which makes it possible to change the compression ratio in an internal combustion engine, and a further object of the invention is to provide means whereby in an engine of the two-stroke cycle type a better controlling of the scavenging air and means for increasing the supercharging are provided.

Another object of this invention is in combination with the combustion chamber or dead space in a piston engine to provide an auxiliary chamber, the volume of which may be varied while the engine is running.

Another object of the invention is in combination with the foregoing to provide means whereby the compression ratio and also the timing of the valves may be varied to meet certain conditions independently or in conjunction with each other.

Another object of the invention is to provide the combustion chamber in the cylinder-head with a nozzlelike passage to the cylinder. In the combustion chamber the intake valves are arranged and the scavenging air which is blown in through one or both of these valves for cleaning the cylinder at the end of the combustion stroke will be directed through the nozzle-like passage as a jet towards the top of the piston, the exhaust valve being arranged in the cylinder-head adjacent the said passage, so that the current of scavenging air—after striking the top of the piston—will be returned and pass out through the exhaust valve.

A further object of this invention is to provide a radial-type internal combustion engine, having a transmission adapted to divert the mechanical power from the engine shaft in two parts, one part of which through an auxiliary shaft is transmitted to the compressor furnishing air and air-fuel mixture for the purpose of scavenging, charging or supercharging the cylinders, while the other part through a main drive flows to a driving propeller, these arrangements being such that the propeller shaft and the compressor shaft may be arranged in alinement with each other in opposite directions and in 90° angle to the crank shaft of the engine, whereby the whole assembly will obtain a flat shape, adapted to streamline mounting inside the wing of an aeroplane with the propeller mounted in front or rear of the wing.

Further objects of this invention will be described more fully in connection with the following specification, which also comprises drawings, illustrating one preferred embodiment of the invention.

Generally speaking, air craft engines should be able to meet both the demand for great boosting of power while the plane is taking off the ground and the demand of high fuel economy, when cruising at normal speed. The two extreme operating conditions are difficult to reconcile, and the conventional type of air craft engines represents nothing but a compromise in regard to fulfilling the two demands. This compromise is established by selecting such a compression ratio that will secure fuel economy to some modest extent, while it will not be so high as to be detrimental to security when the power is boosted to the desired extent for the purpose of taking off. This means that the two demands are met only halfway. The introduction of such means as especially prepared fuels for the boosting of the power and the use of two-stage or double-geared compressors has not brought out an improvement of performance to the desired extent.

As will be understood from the foregoing general outline of the objects of this invention, the drawbacks above mentioned are supposed to be eliminated; and furthermore the invention provides means whereby a two-stroke cycle type internal combustion engine with advantage may be used in air craft engines. Although the majority of the new and novel features of this invention may be used for any type of internal combustion engine of the piston type, the preferred embodiment which shall be described with reference to the drawings is based on the two-stroke cycle type of engine.

In the drawings,

Fig. 1 illustrates a view through an aircraft engine according to this invention, partly in cross section.

Fig. 2 illustrates a view in a plane substantially 90° to Fig. 1 of two opposite lying cylinders.

Fig. 3 illustrates to a considerably smaller scale a complete assembly mounted in an aeroplane wing.

Fig. 4 illustrates a diagram of the working of the engine, based on highest economy, i. e. smallest compression space.

Fig. 5 illustrates a corresponding diagram, based on high boosting.

In the drawings, 1 denotes a crank case, wherein a crank shaft 2 with a crank 3 is mounted.

Onto the crank 3 the different connecting rods 4, 5 etc. to all the cylinders arranged in a star-like way are connected. The pistons 6 are working in cylinders 7, and in the head of the cylinders are arranged exhaust valves 8, leading to exhaust passages 9. In the head of the cylinders adjacent the exhaust valve is a nozzlelike passage 10 which communicates with a cylindrically shaped combustion chamber 11, in the walls of which two intake valves 12 and 13 are arranged directly opposite each other. These three valves, the exhaust valves 8 and the two inlet valves 12 and 13, are by means of suitable connecting members 14, 15 and 16 controlled by a cam sleeve 17 arranged for rotation with an extension 18 of the crank shaft 2.

Means for adjustment of this sleeve 17 in angular relation to the crank shaft are arranged, these means comprising a conically shaped ring gear 19 and spider gears 20 which in turn mesh with a ring gear 21. The spider gears 20 are held in a sleeve 22 which may be turned about the shaft by means of a screw 23. It is thus possible, when desirable, to advance or retard the time of opening and closing of those valves to comply with the changing operating conditions of the machine.

From the chamber 11, an opening 24 leads to a cylinder 25, in which a piston 26 is adapted to move in reciprocating movements. This piston is by means of suitable connecting links or rods 27 under the control of an eccentric disc 28 which turns with the extension 18 of the crank shaft 2. The eccentric disc is mounted on a sleeve 29 which carries a conical ring gear 30 in mesh with spider gears 31, which on the other side are in mesh with a ring gear 32, fixed on the shaft 18. The spider gears 31 are carried on spindles 33 which are carried in a ring 34 which is under the control of a screw 35, by means of which the position of the eccentric disc 28 consequently may be adjusted in angular relation to the shaft 18. These mechanisms act in the following way:

As the eccentric disc 28 is rotated, the connecting means 27 will transmit the movements of the eccentric in relation to the shaft 18 to the piston 26 and thereby cause this piston to move in and out in the cylinder 25 in a definite relation to the rotation of the shaft 18 and consequently in relation to the crank 3 and the piston 6 in the main cylinder 7. This auxiliary piston 26 may thus be used for adjustment of the total volume of the combustion chamber which is made up of the room between the head of the piston and the top of the cylinder 7, the nozzlelike opening 10, the chamber 11 and the cylinder 25. One may thus adjust the eccentric disc 28 in such a way that the piston 26 will arrive at its upper dead center at the same time as the piston 6 arrives at its upper dead center, whereby the highest compression-ratio is attained. By readjustment by means of a screw 35, the ring 34 may be set in such a way that the piston 26 will arrive at its lower dead center when the piston 6 reaches its top position. In that case the lowest compression-ratio is secured, while intermediate positions of the ring 34 will give the desired compression-ratios between the two limits.

These arrangements which have just been described, i. e. the arrangement of the gear 21 and sleeve 22 and further the arrangement of the auxiliary cylinder 25 may be used alone or in combination, all according to the construction of the engine and the demands placed upon the same.

Compressed air for scavenging the exhaust from the cylinder 7 and high-compressed air or air-fuel mixture for filling and supercharging the cylinder 7 is delivered from the compressor 36 through separate pipe lines 37 and 38. One of these pipe lines communicates with the inlet valve 12 and the other with the inlet valve 13.

When the motor in question is of the two-stroke type, and the combustion-gases in the cylinder 7 at the end of the expansion stroke is to be driven out by the scavenging jet of air or gas, this is according to this invention done by first opening only the valve 12, preferably immediately after the opening of the exhaust valve 8. A jet of air at relatively low pressure is then forced in through the valve 12 and through the passage 10 into the cylinder 7 in a manner indicated by the arrows in Fig. 1.

With a certain retard, the other inlet valve 13 is opened and supercharged air or a mixture of air and fuel is then blown in through this valve while the exhaust valves are closed before the valve 13 closes. In this way air of low pressure is first used for blowing out the exhaust, and thereafter a fuel-air mixture is used for completing the scavenging and for supercharging.

Generally speaking one may say that the sequence of valve operations should be as follows:

The exhaust valve or valves should preferably be opened before the first intake valve opens, and closed before or about the same time as the first intake valve closes, but a considerable time before the second intake valve closes.

If this construction, i. e. the combustion chamber 11 is used in combination with the auxiliary cylinder 25, still greater economy in normal running and greater boosting power may be attained.

It has already above been described how the timing of the piston 26 may be adjusted. This adjustment may be done in conjunction with adjustment of the valves or may be done separately. When cruising at high altitudes, the compression-ratio may be selected very high and the fuel economy will accordingly be improved. This will be done by adjusting the piston 26 in such a way that it will work in synchronism with the piston 6. This high compression-ratio will also permit the running of the engine on a lean fuel-mixture, whereby complete combustion is assured without retarding the speed of the combustion unduly. The timing of the valves may be adjusted in such a manner that the effective compression stroke is shortened, while the effective expansion stroke is lengthened correspondingly, or the effective compression stroke may be lengthened while the effective expansion stroke is accordingly shortened.

In the first case of adjustment the result will be an improvement in the conditions effecting fuel economy, due to a more complete expansion of the combustion gases; in the second case the conditions for boosting the power are improved due to the increased quantity of fuel-air mixture that may be admitted to the engine.

If in the first case the ratio of compression is simultaneously raised to the point where the fuel economy is the highest, then the summary effect of the two adjustments, i. e. high compression and full expansion, will result in a degree of fuel economy not achieved in other engines. If in the second case, however, it is desired to boost the power outputs as far as possible by admitting the maximum amount of air and fuel to the engine, it would be desirable to lower the compression ratio somewhat, so as to avoid overtaxing the mechanical resistance of the engine and reduce the peak pressure to permissible limits. Here again the summary effect of the two adjustments will prove a beneficial one.

The working diagrams in Figures 4 and 5 illustrate the results obtained in the two extreme positions. Fig. 4 is the position of highest economy, i. e. with the pistons 26 and 6 reaching simultaneously the upper dead center and reducing the combustion-space to a minimum, while Fig. 5 indicates a position where the piston 25 runs in a phase 180° apart from the piston 6. The valves are in Fig. 4 given the maximum retardation, while in Fig. 5 they are given the maximum advance.

In the practical embodiment of a radial engine according to this invention, all the controlling means 14, 15, 16, 27 etc. for the controlling of the valves, the auxiliary pistons 26 etc. are arranged on one side of the motor crank case, whereby the opposite side is available for the driving gear.

In the example shown in the drawings, the crank shaft 2 passes through the crank case into the gear box and is here connected to a ring gear 39 which meshes with a gear 40 on a shaft 41 which drives the compressor 36 and with one or more gears 42 on a shaft 43 which drives the propeller. These two shafts are—as will be seen from the drawings—arranged in alinement and right opposite to each other and in 90° angle to the crank shaft 2, whereby it is possible to flatten the whole assembly out to a shape suitable to be mounted in the wing of an aeroplane.

An illustration of such mounting is shown in Fig. 3. In Fig. 3 44 denotes a section through the wing of an aeroplane. In the wing the motor 45 is mounted, and from the gear box 46 one can see the shaft 43 leading to the propeller 47, and the shaft 41 leading to the compressor 36. Cooling air enters at 48 and passes out on top of the wing at 49.

I claim:

1. In a two-stroke cycle internal combustion engine, comprising a cylinder and a piston mounted for reciprocating movement therein, inlet and exhaust valves in the cylinder-head, a combustion-chamber in said cylinder-head communicating with the said cylinder through a nozzlelike passage directed downwards towards the top of the piston, the said combustion-chamber having substantially the shape of a cylinder, the axis of which is normal to the axis of the former cylinder, separate inlet valves being mounted in the ends of the said chamber, one of these valves controlling the admission of scavenging-air under pressure, and the other valve controlling the admission of a combustible mixture of air and fuel at a higher pressure than the scavenging air, the said exhaust valve being mounted in the head of the cylinder adjacent the said nozzlelike passage, so that the scavenging air after striking the top of the piston will be diverted upwards towards thhe exhaust valve, means to open the former inlet valve for the admittance of scavenging air before the second inlet valve admits the fuel-air-mixture.

2. In an internal combustion engine having a cylinder and a working piston on a crank shaft in the said cylinder, a combustion chamber or dead space in the cylinder-head and comprising a compartment outside the cylinder, communicating with the same through a nozzlelike passage in the cylinder-head, inlet valves in the said compartment and a cylindrically shaped extension to the said compartment, an auxiliary piston in the said extension and an auxiliary shaft rotating at the same speed as the said crank shaft, means connecting the said auxiliary shaft and the said auxiliary piston so that the said auxiliary piston and the main piston will pass through a predetermined reciprocating movement in relation to each other.

3. In an internal combustion engine having a main cylinder and a main working piston on a crank shaft in the said cylinder, a combustion chamber or dead space in the head of the cylinder and comprising a compartment outside the cylinder, communicating with the same through a nozzlelike passage in the cylinder-head, inlet valves in the said compartment and a cylindrically shaped extension to the said compartment, an auxiliary piston in the said extension and a rotating auxiliary shaft connected with the said crank shaft, means connecting the said auxiliary shaft and the said auxiliary piston, so that the auxiliary piston will pass through a predetermined reciprocating movement in relation to the movements of the main piston, and means in connection with the said auxiliary shaft and means controlling the movement of the auxiliary piston adapted to alter its angular position in relation to the crank shaft in order to alter the cycle of reciprocating movement of the auxiliary piston relatively to the movement of the main piston.

4. In an internal combustion engine having a main cylinder and a main piston working on a crank shaft in the said cylinder, exhaust- and inlet-valves in the cylinder-head, a combustion chamber or dead space in the head of the cylinder and comprising a compartment outside the cylinder, communicating with the same through a nozzlelike passage in the head of the same, inlet valves in the said compartment and a cylindrically shaped extension to the said compartment, an auxiliary piston in the said extension and an auxiliary shaft connected with the said crank shaft, means connecting the said auxiliary shaft and the said auxiliary piston, so that the said auxiliary piston will pass through a predetermined reciprocating movement in relation to the movements of the main piston, and means in connection with the said auxiliary shaft and means controlling the movement of the said auxiliary piston, adapted to alter its angular position in relation to the crank shaft, thereby altering the reciprocating movement of the auxiliary piston relatively to the movement of the main piston, and adjustable means connecting the said valves in operative connection with the said crank shaft, adapted to change the timing of the said valves independently of the timing of the auxiliary piston.

FREDRIK HURUM.